United States Patent [19]

Boundy

[11] 4,097,014
[45] Jun. 27, 1978

[54] COMBINATION SUPPORT BRACKET AND SELF-ADJUSTING WEDGE

[75] Inventor: Bruce K. Boundy, Holland, Mich.

[73] Assignee: Westinghouse Electric Corp., Pittsburgh, Pa.

[21] Appl. No.: 797,889

[22] Filed: May 17, 1977

[51] Int. Cl.² ............................................. A47F 5/00
[52] U.S. Cl. ........................... 248/225.4; 24/263 SW; 403/329
[58] Field of Search ..................... 24/251, 260, 263 R, 24/263 SW, 263 B; 248/214, 215, 219.2, 221.3, 222.1, 224.3, 225.4, 226.5, 225.3, 316 R; 403/329

[56] References Cited

U.S. PATENT DOCUMENTS

| 767,589 | 8/1904 | Moore | 248/214 X |
| 824,149 | 6/1906 | Ruddell, et al. | 24/263 R |
| 895,047 | 8/1908 | Schraudner | 248/215 X |
| 1,586,173 | 5/1926 | Aderente | 248/226.5 |
| 2,534,117 | 12/1950 | Flick | 248/226.5 |
| 3,007,665 | 11/1961 | Derr | 248/225.4 |
| 4,032,101 | 6/1977 | Immordino | 248/225.4 |

FOREIGN PATENT DOCUMENTS 32,812  5/1934  Netherlands .................... 24/263 R Primary Examiner—Lawrence J. Staab
Attorney, Agent, or Firm—B. R. Studebaker

[57] ABSTRACT

A combination support bracket and self-adjusting wedge for mounting and supporting objects on the upper edge of planar panels of varying thicknesses. The support bracket includes an inverted U-shaped saddle member which overlies and surrounds the upper edge of the panel and a self-adjusting wedge member is mounted within the saddle member adjacent one of the side walls thereof and is vertically slidable to vary the spacing between the wedge member and the opposite side wall of the saddle member to thereby accommodate panels of varying thicknesses.

7 Claims, 4 Drawing Figures

COMBINATION SUPPORT BRACKET AND SELF-ADJUSTING WEDGE

BACKGROUND OF THE INVENTION

With the increasing use of the open office plan, as the system by which offices are designed and constructed, wherein a variety of screens and partitions separate work stations and provide visual privacy for the occupants, a need has arisen to provide support for various articles such as lighting fixtures, area and office designations, and similar items above the partition level. In most instances, it is required that these items be mounted to the top edge of the panel or partition. A typical open office landscape system employing planar panels and connecting support posts is illustrated in U.S. Pat. No. 3,762,116 to William C. Anderson et al, for Space Divider System and Connector Assembly Therefor. Almost all of these partition systems involve as their principal constituent a planar panel having a flat top edge of a predetermined thickness.

In the past, many different mechanical devices have been employed to mount items to the top edge of fences, doors, panels, and the like, but in most instances these mechanical devices deformed the element to which they were attached to some degree. An exemplary device is disclosed in U.S. Pat. No. 873,488 for a spring type clip as a support for clotheslines to the top of a fence. A similar clamping device is disclosed in U.S. Pat. No. 3,277,292 for mounting a light supporting wand to a baseboard by use of a U-shaped clip which employs either screws or wing nuts to connect the device to the baseboard of a wall. U.S. Pat. No. 222,086 discloses a clothesline hook mounted to a fence in which a lever operated cam forcibly mounts the C-type clamp to the top edge of the fence. U.S. Pat. Nos. 1,586,173, 1,586,244, 3,891,173 and 3,007,665 also each illustrate clamping mechanisms generally involving deformation, either permanent or temporary, of the surface to which the element is being clamped. Of particular interest is the Waler bracket disclosed in U.S. Pat. No. 3,007,665, which employs a wedging action to clamp the bracket to a stud or similar structural member. This type of clamp or bracket is designed for more permanent connection and employs in each instance serrations which bite into the material causing permanent disfigurement to the member to which it is attached and thereby renders it unsuitable for use with movable office wall partitions which may require changing of the location of the mounting bracket from time to time.

In most office landscape partition systems, there are slight variations in panel thicknesses due to both manufacturing tolerances and the different surfaces employed on the panel. For example, a panel having both wall faces of a smooth laminate will be slightly thinner than the same panel having cloth surfaces thereon. Any mechanism for mounting and retaining objects to the top edge of the panel must be able to accommodate these slight differences in the panel thicknesses through a limited range of adjustments.

SUMMARY OF THE INVENTION

The deficiencies of the above-described prior art have been obviated by the present invention which employs a light clamping force to mount objects to the top edge of a vertical wall panel by providing an inverted U-shaped saddle member including a top wall and a pair of downwardly extending side walls as its principal components. An object or support post is mounted centrally to the top wall of the saddle member and on the under surface of the top wall a resilient pad is mounted to which is attached self-adjusting wedge means adjacent to one of the side walls. The wedge means is slidably movable to vary the distance between the wedge means and the other side wall facilitating the accommodation of panels of varying thicknesses by the saddle member. The self-adjusting wedge means includes a central planar portion which lies in a plane essentially parallel to the adjacent side wall of the U-shaped saddle member. At the bottom edge of the planar portion, a flange extends at a slight angle toward the adjacent side wall and at the upper edge, a second flange portion extends at a slight angle away from the adjacent side wall. A pair of mounting tabs extend from the upper edge of the second flange portion and mount the self-adjusting wedge to the resilient pads. If the panel is on the thick end of the thickness tolerance of the mounting bracket, the central planar portion of the wedge member has full face contact with the panel and the adjacent side wall. If the panel is on the thin end of the thickness range of the support bracket the top of the panel as it enters the channel will engage the horizontal tabs of the wedge member pulling the wedge into the channel causing the angular flanges to take up the space difference and secure the U-shaped saddle member to the panel.

BRIEF DESCRIPTION OF THE DRAWING

Many of the attendant advantages of the present invention will become more readily apparent and better understood as the following detailed description is considered in connection with the accompanying drawing, in which.

DESCRIPTION OF THE PREFERRED EMBODIMENT

Figure 2:
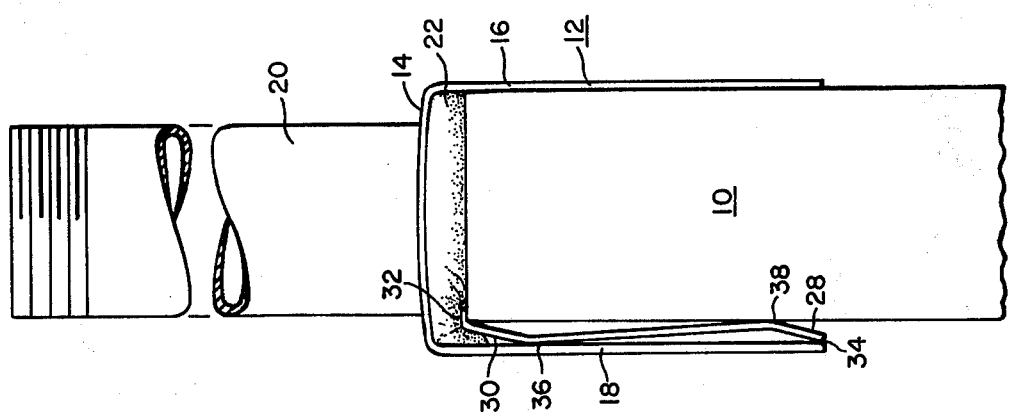
FIG. 2 is an end elevational view, similar to FIG. 1, illustrating the support bracket mounted to a panel of minimum thickness.
Figure 1:
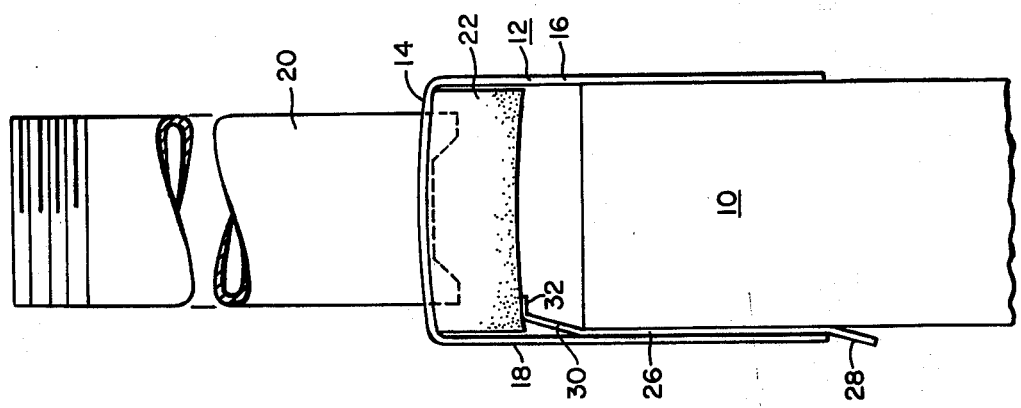
FIG. 1 is an end elevational view of the support bracket mounted to a panel of maximum thickness.
Figure 3:
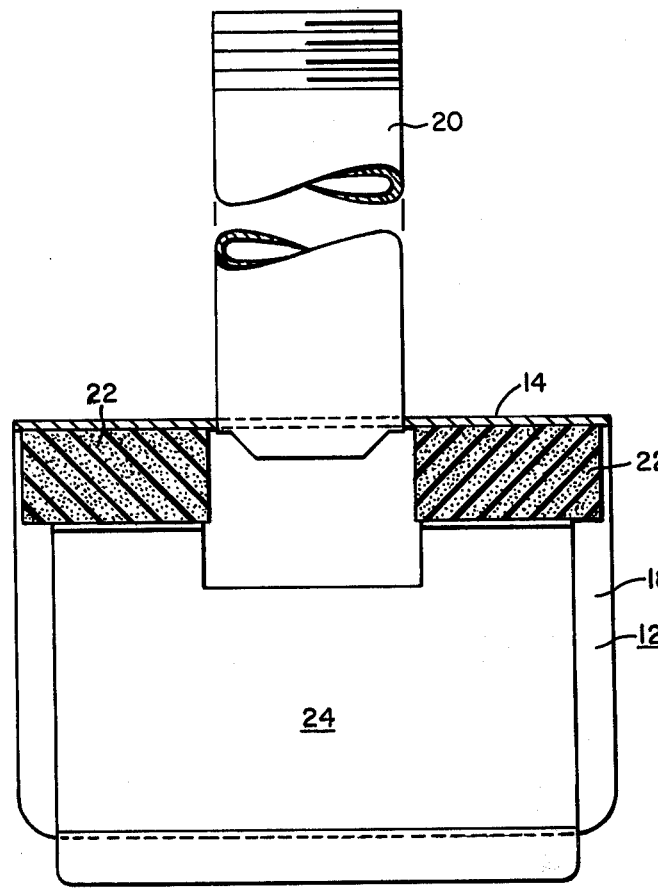
FIG. 3 is a side elevational view partly in section of the saddle and wedge of this invention.
Figure 4:
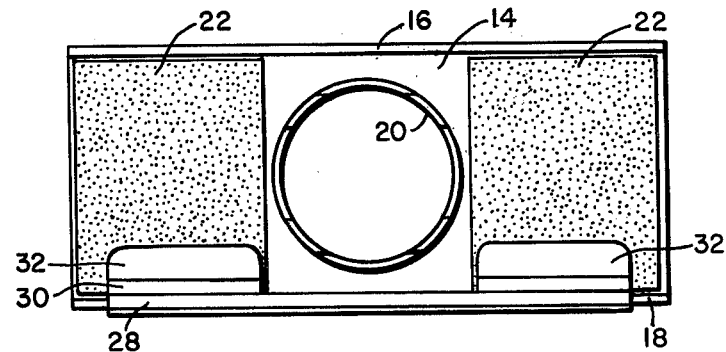
FIG. 4 is a bottom plan view of the saddle and wedge.

Referring now in detail to the drawing, wherein like reference characters represent like parts throughout the several views, there is illustrated in FIGS. 1 and 2 similar end elevation views of the combination support bracket and self-adjusting wedge mounted to space dividing wall panels of maximum thickness (FIG. 1) and minimum thickness (FIG. 2). The support bracket and self-adjusting wedge are mounted to the top of a conventional space dividing wall panel 10 of varying thicknesses. The saddle member is in the form of an elongated inverted U-shaped saddle or channel 12, including a top wall 14, and downwardly directed side walls 16 and 18. Centrally disposed in the top wall 14, for purposes of illustration, is a tubular support post 20 which may be used to support, for example, a lighting fixture above the space dividing wall panel 10 in the manner disclosed in copending application Ser. No. 797,894, for an Illuminated Space Dividing Wall Panel System, filed the same day as this application by William C. Anderson et al and owned by the assignee of this application. As will be readily apparent, the mounting of the support post 20 centrally of the top wall 14 of support bracket 12 is merely one possible application of the combination support bracket and self-adjusting wedge of this invention, and many other mounting applications will become readily apparent to those skilled in the art.

On the underside of the top wall 14 are a pair of spaced resilient pad means 22 which are preferably of a polyurethane foam.

The self-adjusting wedge is generally designated 24 and is constructed of sheet metal and includes a central planar portion 26 bounded at its upper and lower ends with flange portions 28 and 30 which extend at a slight angle from the central planar portion. The upper flange portion 30 has extending therefrom, in a horizontal direction, perpendicular to the planar portion 26, a pair of tab members 32. The tabs 32 are secured to the underside of the resilient pad members 22 by, for example, gluing or taping or some other conventional method. The tabs 32 are secured to the polyurethane foam pads 22 in a location such that the main planar portion 26 of the wedge member hangs in a vertical position immediately adjacent the side wall 18 of the inverted U-shaped channel member 12.

In operation, the combination support bracket and self-adjusting wedge is slipped over the upper edge of a planar wall panel or the like, and if the thickness dimension of the wall panel is the maximum which is accommodable by the unit the mounting will appear as illustrated in FIG. 1. If the panel 10 is of a thickness dimension which is the smallest accommodable by the support bracket and self-adjusting wedge, the panel 10 as it enters the saddle will abut the horizontally extending tabs 32 causing the wedge member 24 to slide vertically upwardly into the channel defined by the inverted U-shaped saddle member. More particularly, as the upper edge of the panel 10 engages the tabs 32 the weight of the support bracket and the item supported thereby will cause the resilient pad members 22 to deform as illustrated in FIG. 2 thus pulling the wedge into the channel member 12. Because of the double wedge action, pressure is applied between the wedge member and the side wall 18 at points 34 and 36 and against the panel 10 at 38. As will be apparent when wall panel thicknesses are between the maximum thickness illustrated in FIG. 1 and the minimal thickness illustrated in FIG. 2, the wedge member 24 will slide up into the U-shaped saddle member 12 only to the extent that binding occurs between the lower flange member 28 and the side wall 18 of the channel.

As will be apparent from the foregoing, the wedge member may be modified to accept greater ranges of wall panel thicknesses by either extending the length of the lower flange member 28 or increasing the angular relationship between the planar central portion 26 and the lower flange portion 28. It will also be seen that the combination support bracket and self-adjusting wedge of this invention provides a firm but easily releasable mounting to the upper edge of a wall panel without the cost or deformation provided by threaded adjusting screws or other positive locking hardware.

What is claimed is:

1. A combination support bracket and self-adjusting wedge comprising:
    an inverted U-shaped saddle member including a top wall and a pair of downwardly extending side walls;
    resilient pad means mounted to the underside of said top wall between said side walls; and
    self-adjusting wedge means including a central planar portion and a pair of mounting tabs, said mounting tabs mounted to said resilient pad means adjacent one of said side walls, and said wedge means being movable to vary the distance between said wedge means and the other of said side walls whereby said saddle member can accommodate panels of varying thicknesses.

2. A combination support bracket and self-adjusting wedge of claim 1, wherein said central planar portion of said self-adjusting wedge means lies in a plane parallel to said adjacent side wall, said central planar portion having at its bottom edge a first flange extending at a slight angle toward said adjacent side wall, and at its upper edge a second flange portion extending at a slight angle away from said adjacent side wall, said pair of mounting tabs extending from the upper edge of said second flange portion for mounting said self-adjusting wedge to said resilient pad means.

3. The combination support bracket and self-adjusting wedge according to claim 1, wherein a support post is mounted centrally to the top wall of said inverted U-shaped saddle member.

4. The combination support bracket and self-adjusting wedge according to claim 2, wherein said resilient pad means is a pair of spaced polyurethane foam pads.

5. The combination support bracket and self-adjusting wedge for mounting and supporting objects on the upper edge of planar wall panels of varying thicknesses, comprising:
    an inverted channel member including a top wall and a pair of downwardly extending side walls;
    resilient pad means mounted to the underside of said top wall between said side walls; and
    self-adjusting wedge means mounted to said resilient pad means adjacent one of said side walls, said self-adjusting wedge means including a central planar portion aligned in a plane essentially parallel to said adjacent side wall, said central planar portion having at its bottom edge a first flange portion extending at a slight angle toward said adjacent side wall, and at its upper edge a second flange portion extending at a slight angle away from said adjacent side wall, and a pair of mounting tabs extending from the upper edge of said second flange portion, said mounting tabs being secured to said resilient pad means.

6. The combination support bracket and self-adjusting wedge according to claim 5, wherein a support post is mounted centrally to the top wall of said inverted U-shaped saddle member.

7. The combination support bracket and self-adjusting wedge according to claim 5, wherein said resilient pad means is a pair of spaced polyurethane foam pads.

* * * * *